(12) United States Patent
Waggoner

(10) Patent No.: US 11,689,598 B1
(45) Date of Patent: Jun. 27, 2023

(54) SYNCHRONIZED OUT-OF-ORDER LIVE VIDEO ENCODING FOR REDUCED LATENCY

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 17/204,499

(22) Filed: Mar. 17, 2021

(51) Int. Cl.
| | |
|---|---|
| *H04L 65/70* | (2022.01) |
| *H04N 19/159* | (2014.01) |
| *H04N 19/172* | (2014.01) |
| *H04L 65/75* | (2022.01) |
| *H04L 65/612* | (2022.01) |

(52) U.S. Cl.
CPC ............ *H04L 65/70* (2022.05); *H04L 65/612* (2022.05); *H04L 65/75* (2022.05); *H04N 19/159* (2014.11); *H04N 19/172* (2014.11)

(58) Field of Classification Search
CPC ..... H04L 65/70; H04N 19/159; H04N 19/172
See application file for complete search history.

(56) References Cited

U.S. PATENT DOCUMENTS

| | | | | |
|---|---|---|---|---|
| 9,596,283 | B2 * | 3/2017 | Holden | ............ H04N 21/23439 |
| 2004/0218816 | A1 * | 11/2004 | Hannuksela | ........... H04N 19/42 |
| | | | | 382/232 |
| 2005/0147163 | A1 * | 7/2005 | Li | ........................ H04N 19/105 |
| | | | | 375/E7.161 |
| 2012/0140825 | A1 * | 6/2012 | Huang | ................. H04N 19/114 |
| | | | | 375/E7.243 |
| 2016/0212373 | A1 * | 7/2016 | Aharon | ................ H04N 19/513 |
| 2020/0105111 | A1 * | 4/2020 | Messer | ............ G08B 13/19678 |

FOREIGN PATENT DOCUMENTS

JP              200674327 A  *  3/2006

* cited by examiner

*Primary Examiner* — Caroline H Jahnige
(74) *Attorney, Agent, or Firm* — Nicholson De Vos Webster & Elliott LLP

(57) ABSTRACT

Techniques for synchronized out-of-order live video encoding are described. As one example, a computer-implemented method includes receiving a first real-time encoded live video, that is in a coded order that is different than a display order, at a content delivery service from a contribution encoder at a different location than the content delivery service, performing, in the coded order, a real-time decode of the first real-time encoded live video by a distribution decoder of the content delivery service to generate a decoded video in the coded order, performing, in the coded order, a real-time encode of the decoded video by a distribution encoder of the content delivery service to generate a second real-time encoded video in the coded order without waiting on a reordering of the decoded video into the display order, and transmitting the second real-time encoded video in the coded order to a client device.

20 Claims, 10 Drawing Sheets

CODED ORDER 300

SYNCHRONIZED OUT-OF-ORDER LIVE VIDEO ENCODING FOR REDUCED LATENCY

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Various embodiments of methods, apparatuses, systems, and non-transitory computer-readable storage media for synchronized out-of-order live video encoding are described. According to some embodiments, an encoder encodes data (e.g., a video file) for transmission or storage (e.g., in encrypted form), and a decoder reverses the encoding for playback or editing, e.g., according to a coder-decoder (codec) standard. Certain content (e.g., video) delivery systems receive video from an (e.g., "contribution") encoder (e.g., on premises with the camera recording the video), for example, that sends a compressed master (e.g., "mezzanine") video file that is used to produce additional encoded (e.g., compressed) video file(s) (e.g., streams and/or downloads) by the content delivery system, e.g., for viewing by an end viewer. In certain embodiments, the content delivery system includes a (e.g., "distribution") decoder to decode the encoded video from a contribution encoder and an (e.g., "distribution") encoder to generate encoded video from that decoded video.

In certain embodiments, the encoding (e.g., according to a codec standard) of a video file results in compressed frames, for example, one or more intra-coded picture frames (I-frames) (e.g., with each I-frame as a complete image), one or more switch frames (S-frames) (for example, with each S-frame indicating a place in a video stream that is free of dependencies on data previously sent, e.g., but the S-frame taking up less space than an I-frame), one or more unidirectional predicted picture frames (P-frames or delta-frames) (for example, with each unidirectional P-frame having only the changes in the image from the previous frame in display order), and/or one or more bidirectional predicted picture frames (B-frames) (for example, by using differences between the current frame and the preceding ("past" in display order) frame(s) and/or following ("future" in display order) frame(s) to specify its content, e.g., to further save space (e.g., bits) and/or for better interpolation.

Figure 2:
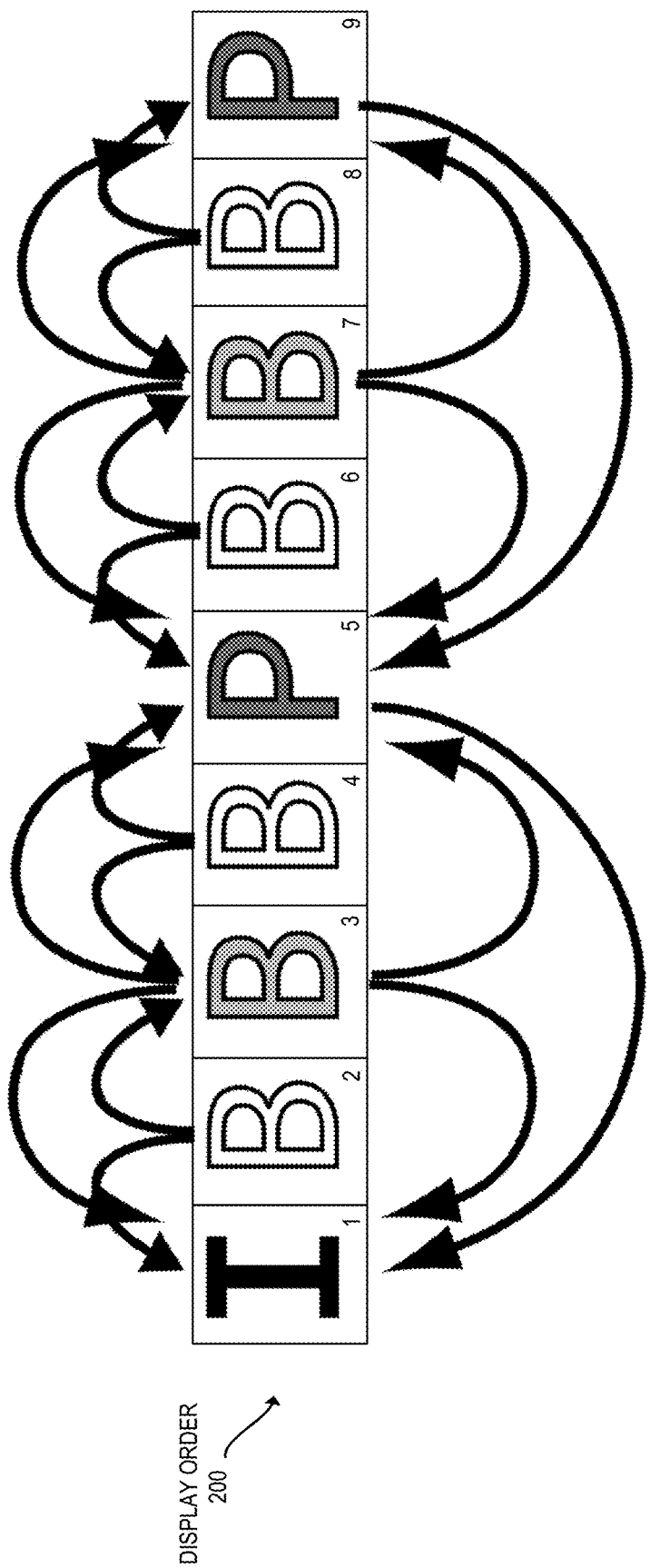
FIG. 2 is a diagram illustrating an example display order of frames according to some embodiments.
Figure 3:
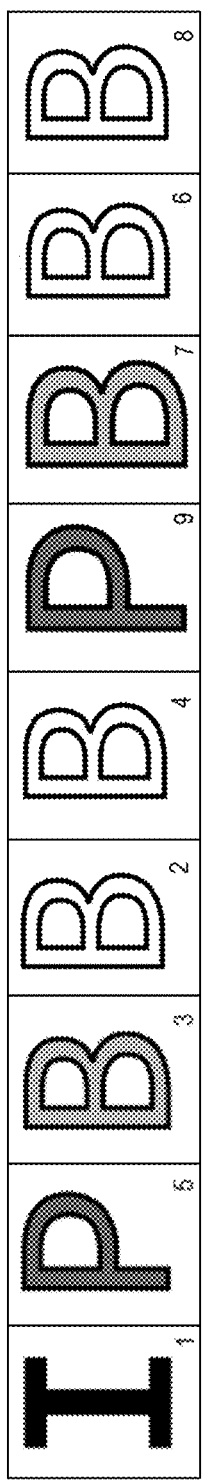
FIG. 3 is a diagram illustrating an example coded order of frames from FIG. 2 according to some embodiments.

In certain embodiments, the future frame that a bidirectional predicted picture frame references must be encoded before encoding the bidirectional predicted picture frame, and thus results in out-of-order encoding (and decoding). For example, as shown in FIGS. 2-3, a section of a video file with six bidirectional predicted picture frames may have a display order of IbBbPbBbP (where a capital B-frame (shaded B in FIGS. 2-3) is used as a reference by another frame and a lowercase b-frame (hollow B-in FIGS. 2-3) is not used as a reference by another frame) but the coded (e.g., encode and decode) order would be IPBbbPBbb (e.g., a different order than the display/recorded order).

In those embodiments, latency for encode and decode increases with an increasing (e.g., the maximum) number of bidirectional predicted picture frames (e.g., b-frames) owing to the reordering of frames from coded order back to display order before a distribution encoder can encode those frames. In certain embodiments, because video encoding, and particularly, live encoding of live video, is latency sensitive, this causes a low number of bidirectional predicted picture frames (e.g., b-frames) to be used in both a contribution encoder (e.g., that generates a "mezzanine" high quality stream used as source for a distribution encoder) and in a distribution encoder. In certain embodiments, the total broadcast delay goes up proportionally to the number of bidirectional predicted picture frames used in the contribution stream and the number of bidirectional predicted picture frames used in the delivery streams.

To overcome these issues, embodiments herein synchronize the out of (display) order encoding between a contribution encoder and a distribution encoder to match. For example, certain embodiments herein are directed to a content delivery service (e.g., a distribution encoder thereof) that performs an encoding of the "coded order" output from a contribution encoder without reordering the frames from coded order into display order, e.g., with the time savings thereof allowing for live encoding of live video. As one example, if a contribution encoder is encoding a sequence of frames of IbBbP in a coded (e.g., encode) order of IPBbb, the distribution decoder can decode those frames in the coded order and the distribution encoder can encode those frames in the same coded order (e.g., pattern) without waiting for display order decoding/reordering. In this example, the distribution encoder can encode the I, P, B, b, and b frames as they arrive (or with a short lookahead buffer) without any additional broadcast delay, e.g., as long as the maximum number of bidirectional predicted picture frames (e.g., B-frames) used in the distribution encoder are not greater than the number used in the contribution encoder. In one embodiment, the maximum number of bidirectional predicted picture frames (e.g., B-frames) is included in the header of each group of pictures (GOP), so is known in advance of the first frame of a GOP being decoded, for example, there is no requirement for the contribution feed to indicate it, and it can be determined from encoders and feeds.

In certain embodiments, an open GOP (e.g., referencing frames outside that GOP) or a closed GOP (e.g., referencing only frames inside that GOP) can be copied in this manner For example, where if the contribution feed is open GOP and the distribution feed is closed GOP, that may add broadcast delay.

Figure 1:
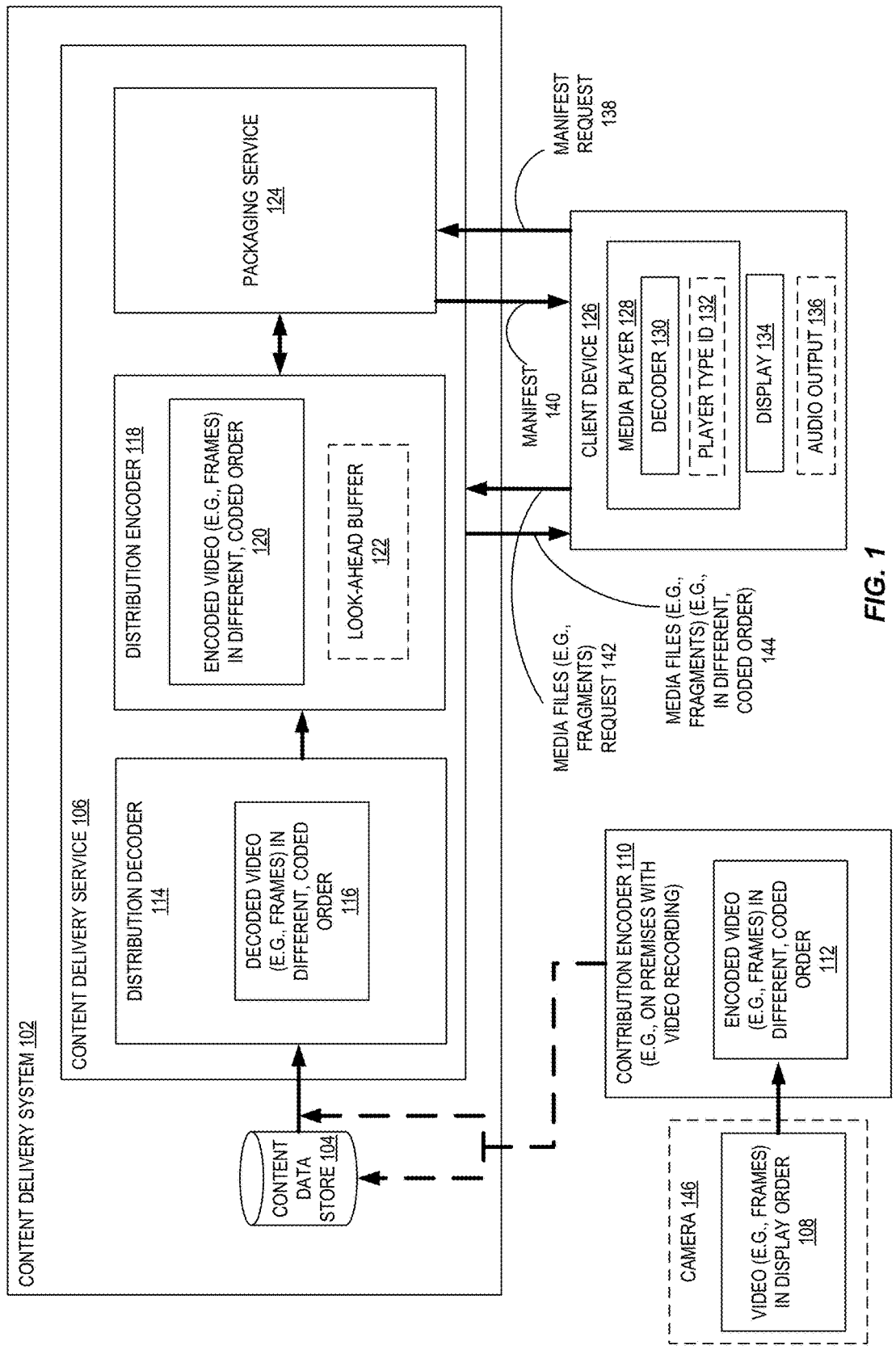
FIG. 1 is a diagram illustrating an environment including a content delivery system according to some embodiments.

Turning now to the figures, FIG. 1 is a diagram illustrating an environment including a content delivery system 102 according to some embodiments. The depicted content delivery system 102 includes a content data store 104 and a content delivery service 106, each which may be implemented in one or more data centers. In certain embodiments, video 108 (e.g., frames) in display order (e.g., as shown in FIG. 2) are generated, for example, generated separately from content delivery system 102. In one embodiment, video 108 (e.g., live video feed) is generated by a camera 146 that is on premises of the event being recorded. In certain embodiments, a contribution encoder 110 receives video 108 (e.g., a proper subset of frames of video 108) and performs an encoding of that (e.g., live) video to generate an output of an encoded video 112 (e.g., frames) in a different, coded order (e.g., as shown in FIG. 3). In one embodiment, each (e.g., predicted picture) frame is encoded once the frames that it is to reference are received. In one embodiment, contribution encoder receives a live video feed and encodes the stream of video 108 into a single, high-quality mezzanine stream of video 112 for transportation (or further processing) by content delivery service 106, e.g., that outputs an adaptive bitrate (ABR) stream of media file 144.

In certain (e.g., live) embodiments, content delivery service 106 receives encoded video 112 in coded order directly from contribution encoder 110, e.g., without utilization of content data store 104 (e.g., via the rightmost dashed arrow in FIG. 1), although in other embodiments, content data store 104 is used to store (e.g., buffer) encoded video 112. In certain embodiments, content delivery service 106 is not to reorder the encoded video 112 in coded order back into the display order. Certain embodiments herein are directed to a content delivery service 106 (e.g., a distribution encoder 118 thereof) that performs an encoding of the "coded order" video 112 output from contribution encoder 110 without reordering the frames from coded order into display order, e.g., with the time savings thereof allowing for live encoding of live video.

FIG. 2 is a diagram illustrating an example display order 200 of frames according to some embodiments. FIG. 3 is a diagram illustrating an example coded order 300 of frames from FIG. 2 according to some embodiments. It should be understood that FIGS. 2 and 3 may include more frames, e.g., as a single GOP or a proper subset of a GOP. In FIG. 2, display order 200 of section of a video file has six bidirectional predicted picture frames that have a display order (shown with an index of 1 to 9) of IbBbPbBbP where a capital B-frame (shown as a shaded B in FIGS. 2-3) is used as a reference by another frame and a lowercase b-frame (shown as hollow B-in FIGS. 2-3) is not used as a reference by another frame). An arrow originating from a frame indicates the frames that are referenced (pointed to) (e.g., and an encoder encodes only the changes relative to the referenced image(s)). For example, with I-frame (index 1) not referencing any frames, b-frame (index 2) referencing I-frame (index 1) and B-frame (index 3), B-frame (index 3) referencing I-frame (index 1) and P-frame (index 5), b-frame (index 4) referencing B-frame (index 3) and P-frame (index 5), P-frame (index 5) referencing I-frame (index 1), b-frame (index 6) referencing P-frame (index 5) and b-frame (index 7), B-frame (index 7) referencing P-frame (index 5) and P-frame (index 9), b-frame (index 8) referencing B-frame (index 7) and P-frame (index 9), and P-frame (index 9) referencing P-frame (index 5). In order to encode certain of these frames, the corresponding reference frames are to be encoded before that certain frame, and thus the coded order is different than the display order in certain embodiments, e.g., with the coded order determined by contribution encoder 110 based on the frame references (e.g., dependencies). FIG. 3 illustrates a coded (e.g., encode and decode) order of IPBbbPBbb (with indices now ordered as 1, 5, 3, 2, 4, 9, 7, 6, 8), which is a different order than the display/recorded order.

Turning back to FIG. 1, in certain embodiments, a content delivery system 102 (e.g., content delivery service 106) begins processing of encoded video (e.g., frames) 112 in coded order (e.g., immediately) upon receipt in that same, coded order. For example, with distribution decoder 114 decoding the encoded video (e.g., frames) 112 into corresponding decoded video (e.g., frames 116 in that same coded order (e.g., a one-to-one ratio of frames in video 112 and video 116). In certain embodiments, distribution encoder 118 is to receive decoded video (e.g., frames) 116 from distribution decoder 114 and then encode those decoded frames into encoded video (e.g., frames) 120 in that same coded order. In certain embodiments, the content delivery system 102 (e.g., content delivery service 106) performs an encode of video 108 in coded order, e.g., by distribution decoder 114 decoding encoded video 112 into decoded video 116 and distribution encoder 118 encoding decoded video 116 in that coded order into encoded video 120 in that coded order. In certain embodiments, the performing of the encode (e.g., by distribution encoder 118) and/or the performing of any decode (e.g., by the distribution decoder 114) is without waiting for display order decoding and/or reordering into display order. In one embodiment, the decoding by distribution decoder 114 is performed on each frame as it arrives from contribution encoder 110, e.g., on a per frame granularity, and/or the encoding by distribution encoder 118 is performed on each decoded frame as it arrives from distribution decoder 114, e.g., on a per frame granularity. In one embodiment, the encoding by distribution encoder 118 is performed on each decoded frame as it arrives from distribution decoder 114 into look-ahead buffer 122, e.g., storing multiple decoded frames.

In certain embodiments, content delivery system 106 ingests content from an (e.g., on-premises with camera 146) contribution encoder 110 into the content delivery system (e.g., the "cloud"). In one embodiment, the source for a job flow comes is the (e.g., on-premises) contribution encoder 110, and the output points to the content delivery service 106

(for example, the distribution decoder 114 and/or distribution encoder 118, e.g., in the cloud). In one embodiment, the content from the contribution encoder 110 is a compressed master (e.g., "mezzanine") video file used as a source for creating final encodes that are delivered to consumer (e.g., viewer) devices, e.g., client device 126. In one embodiment, a mezzanine video (e.g., stream) is a lightly compressed (e.g., as compared to media file(s) 144 provided to a client device 126) video (e.g., stream) that takes up less space than a full resolution uncompressed video (e.g., stream). In one embodiment, the quality of a mezzanine video (e.g., stream) is high enough to use as a source for creating final encodes that are delivered to consumer devices. For example, with content delivery service 106 compressing the mezzanine video into multiple versions for on-demand distribution to consumer (e.g., viewer) devices. In one embodiment, the source of video 108 is external to the content delivery system 102, e.g., and the source sends configuration information (e.g., encryption and source type) and a network address to content delivery system 102.

In certain embodiments, distribution encoder 118 uses a higher sampling level (e.g., subsampling) (e.g., of chroma components) (e.g., to generate less detail) than a contribution (e.g., source) encoder 110. For example, where a 4:4:4 (Y:Cb:Cr video, respectively) encoding means that four out of every four (all) pixels in a section are retained in the encoded image (e.g., frame). In certain embodiments, contribution encoder 110 reduces the number of pixels used to reproduce an image (e.g., video frame) by encoding with chroma subsampling, e.g., at a 4:2:2 encoding where only 2 out of every 4 chroma pixels are retained in the encoded image. In certain embodiments, distribution encoder 118 (e.g., further) reduces the number of pixels used to reproduce an image (e.g., video frame) by encoding with more (e.g., lower resolution) chroma subsampling, e.g., at a 4:2:0 encoding where only 1 out of every 4 chroma pixels are retained in the encoded image.

Additionally or alternatively, in certain embodiments, a distribution encoder 118 uses a different (e.g., less) bit depth than a contribution (e.g., source) encoder 110, e.g., with the distribution encoder 118 using "8-bit" (or 10-bit) color depth for each pixel and the contribution (e.g., source) encoder 110 using "10-bit" (or 12-bit, respectively) color depth for each pixel. Thus, in certain embodiments it is desirable to have images (e.g., frames in a mezzanine file) output from contribution (e.g., source) encoder 110 have more information than the corresponding version of the images output from the distribution encoder 118, e.g., where the editing of the file by the content delivery system 102 may include one or more lossy steps.

Additionally or alternatively, in certain embodiments, a distribution encoder 118 uses a different frame size than a contribution (e.g., source) encoder 110, e.g., with the distribution encoder 118 using a first frame size and the contribution (e.g., source) encoder 110 using a larger (or smaller) second frame size.

Additionally or alternatively, in certain embodiments, a distribution encoder 118 uses a different resolution than a contribution (e.g., source) encoder 110, e.g., with the distribution encoder 118 using a first resolution and the contribution (e.g., source) encoder 110 using a higher (or lower) resolution.

Additionally or alternatively, in certain embodiments, a distribution encoder 118 uses a different frame rate than a contribution (e.g., source) encoder 110, e.g., with the distribution encoder 118 using a first frame rate and the contribution (e.g., source) encoder 110 using a higher (or lower) frame rate.

In certain embodiments, after forming encoded video (e.g., frame(s)) 120, the video may then be sent to a client device 126, for example, (optionally) after packaging by packaging service 124.

In certain embodiments, packaging service 124 creates one or more sets of video (or multimedia that includes the video and corresponding audio) representations (e.g., a media presentation), for example, a representation according to a standard (e.g., a MPEG-DASH standard, a HyperText Transfer Protocol (HTTP) Live Streaming (HLS) standard, or a Smooth Streaming standard). Content delivery service 106 may include a plurality of instances of content delivery service 106 (e.g., distribution decoder 114 and/or distribution encoder 118), e.g., to process multiple inputs in parallel.

It may be generally unrealistic to encode the media file into an almost boundless number of video and audio representations. Instead, embodiments herein generate a manifest of the available representations (e.g., from distribution encoder 118) and form a superset manifest. The packaging service 124 then uses the superset manifest to generate a manifest identifying a proper subset of video (e.g., and audio) representations for a particular client device 126 (e.g., based on the client's media player 128 (e.g., determined from its (optional) type ID value 132) (e.g., decoder 130 thereof to allow decoding for playback), display 134, and (optional) audio output 136 capabilities, and/or available bandwidth). In certain embodiments, the content is stored (e.g., in the content delivery system 102) in two parts: (i) the manifest of all possible media representations (e.g., their URL addresses and, optionally, other characteristics), and (ii) the media representations (e.g., stream of fragments) in a single (e.g., container) or multiple files. In one embodiment, a client device 126 is to read (or store) a manifest 140 (e.g., sent in response to manifest request 138) before the client device may make a request 142 for the media from that manifest, and thus access media files 144 (e.g., video frames that are a representation of the (e.g., live) video 108.

Events that are described herein as occurring in real-time (or near real-time) can happen as instantaneously as possible, limited by certain factors such as the time required for transferring data (e.g., requests and responses) between computing devices, and the ability of computer hardware and software to process information. Real-time (or near real-time) can also mean immediately, as it happens; e.g., in the context of a system that processes data, these terms may mean processing data as it is received as opposed to storing or persisting the data once received for processing later on.

Figure 4:
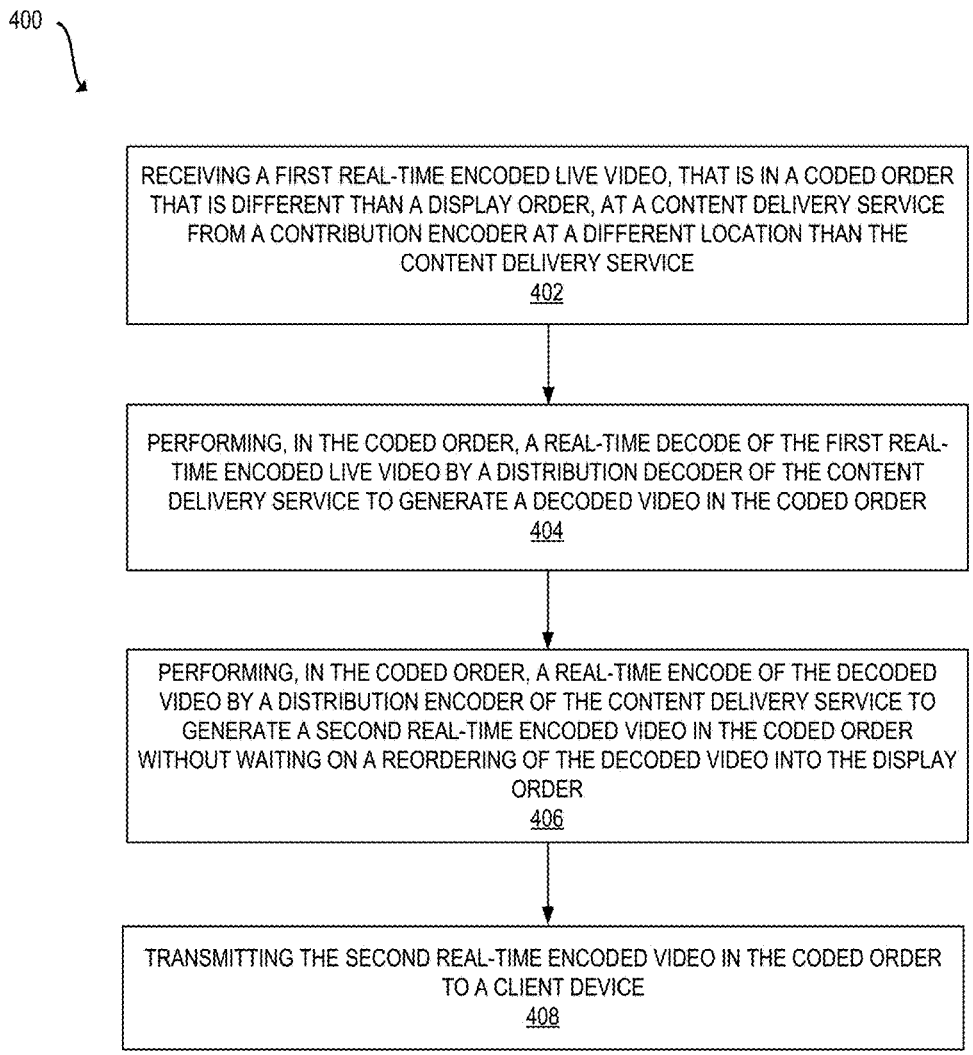
FIG. 4 is a flow diagram illustrating operations of a method for performing a real-time video encode according to some embodiments.

FIG. 4 is a flow diagram illustrating operations 400 of a method for performing a real-time (e.g., perceptible to a human as being in real-time) video encode according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by content delivery system 102 (e.g., implemented in a provider network) of the other figures.

The operations 400 include, at block 402, receiving a first real-time encoded live video, that is in a coded order that is different than a display order, at a content delivery service from a contribution encoder at a different location than the content delivery service. The operations 400 further include, at block 404, performing, in the coded order, a real-time decode of the first real-time encoded live video by a distribution decoder of the content delivery service to generate a decoded video in the coded order. The operations 400 further include, at block 406, performing, in the coded order, a real-time encode of the decoded video by a distribution encoder of the content delivery service to generate a second real-time encoded video in the coded order without waiting on a reordering of the decoded video into the display order. The operations 400 further include, at block 408, transmitting the second real-time encoded video in the coded order to a client device.

Figure 5:
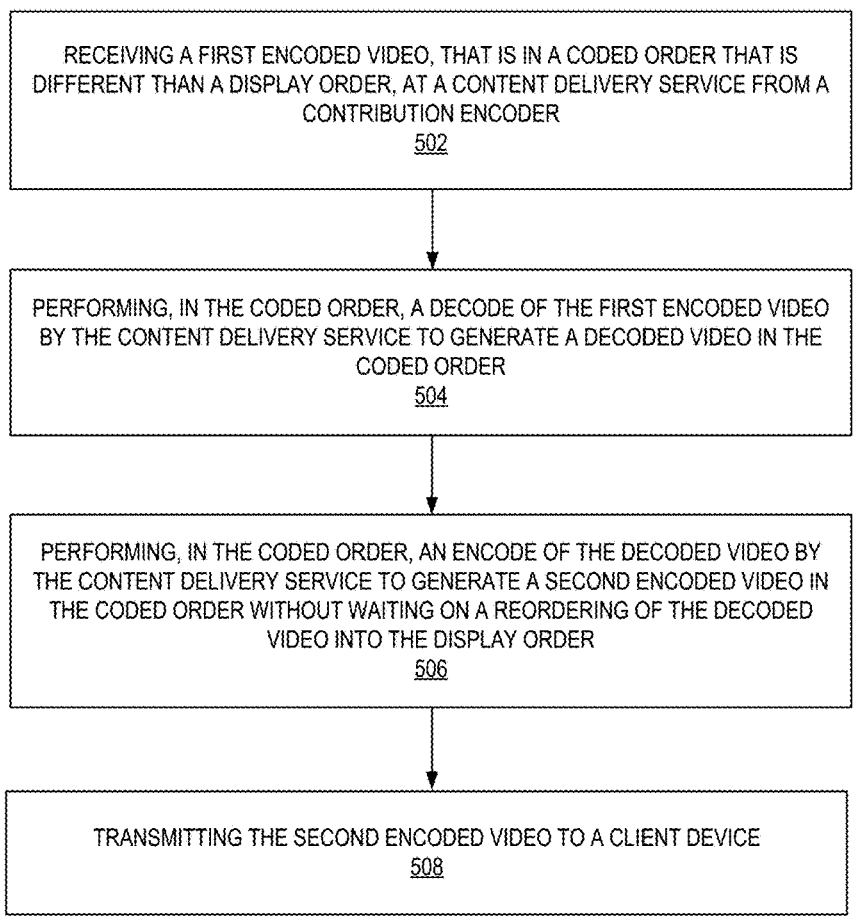
FIG. 5 is a flow diagram illustrating operations of a method for performing a video encode according to some embodiments.

FIG. 5 is a flow diagram illustrating operations 500 of a method for performing a video encode according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by content delivery system 102 (e.g., implemented in a provider network) of the other figures.

The operations 500 include, at block 502, receiving a first encoded video, that is in a coded order that is different than a display order, at a content delivery service from a contribution encoder. The operations 500 further include, at block 504, performing, in the coded order, a decode of the first encoded video by the content delivery service to generate a decoded video in the coded order. The operations 500 further include, at block 506, performing, in the coded order, an encode of the decoded video by the content delivery service to generate a second encoded video in the coded order without waiting on a reordering of the decoded video into the display order. The operations 500 further include, at block 508, transmitting the second encoded video to a client device.

Exemplary environments, systems, etc. that the above may be used in are detailed below.

Figure 6:
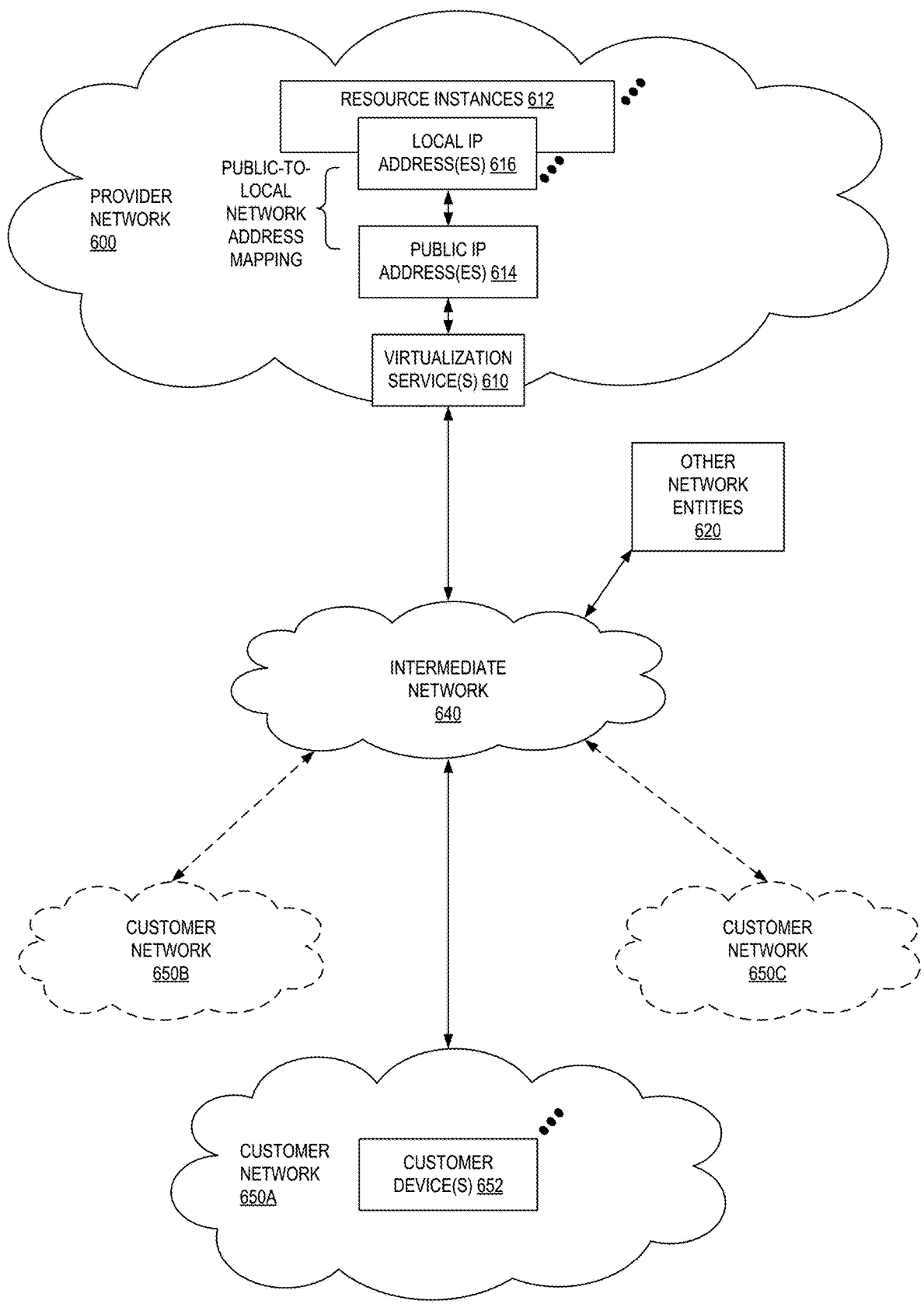
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
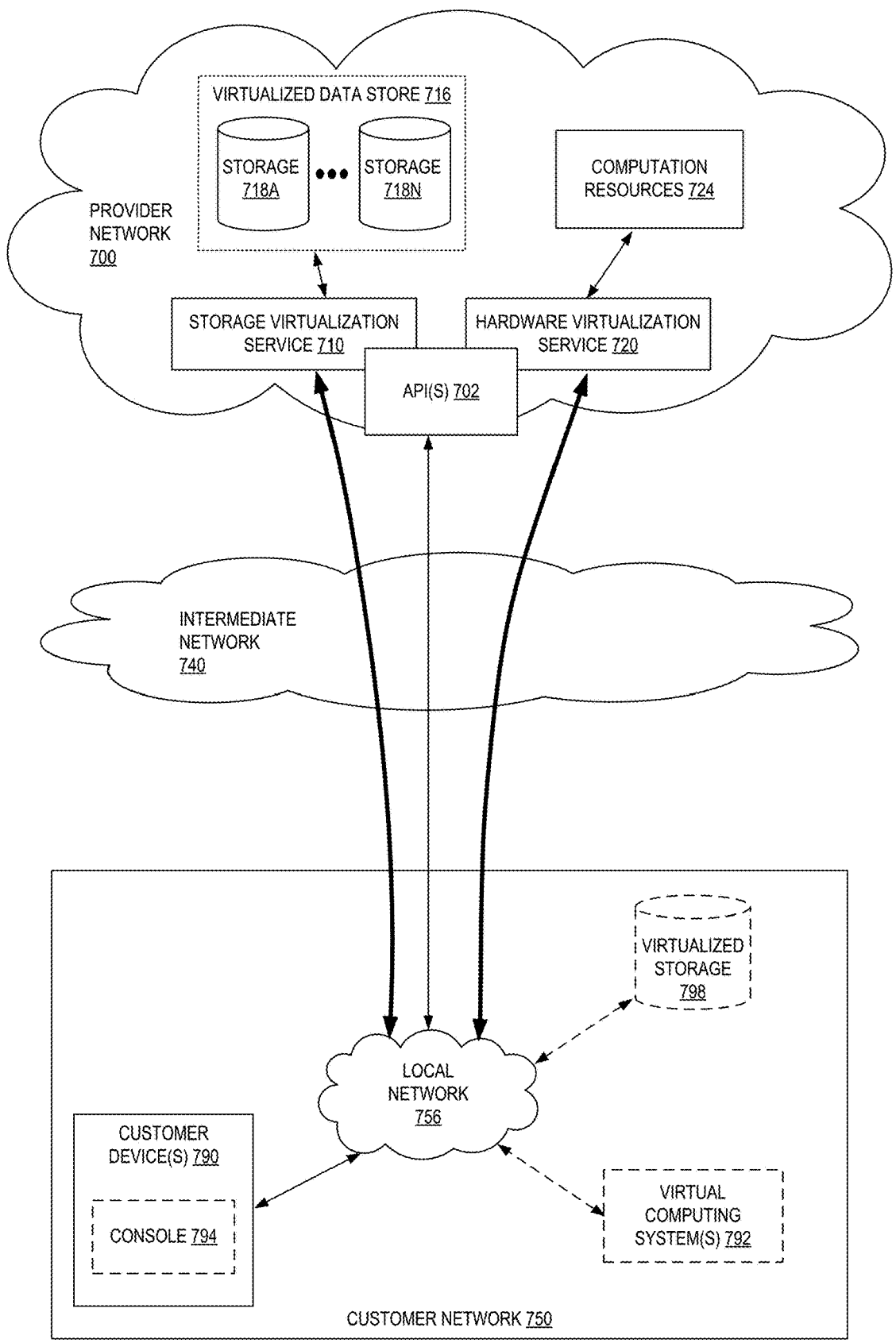
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
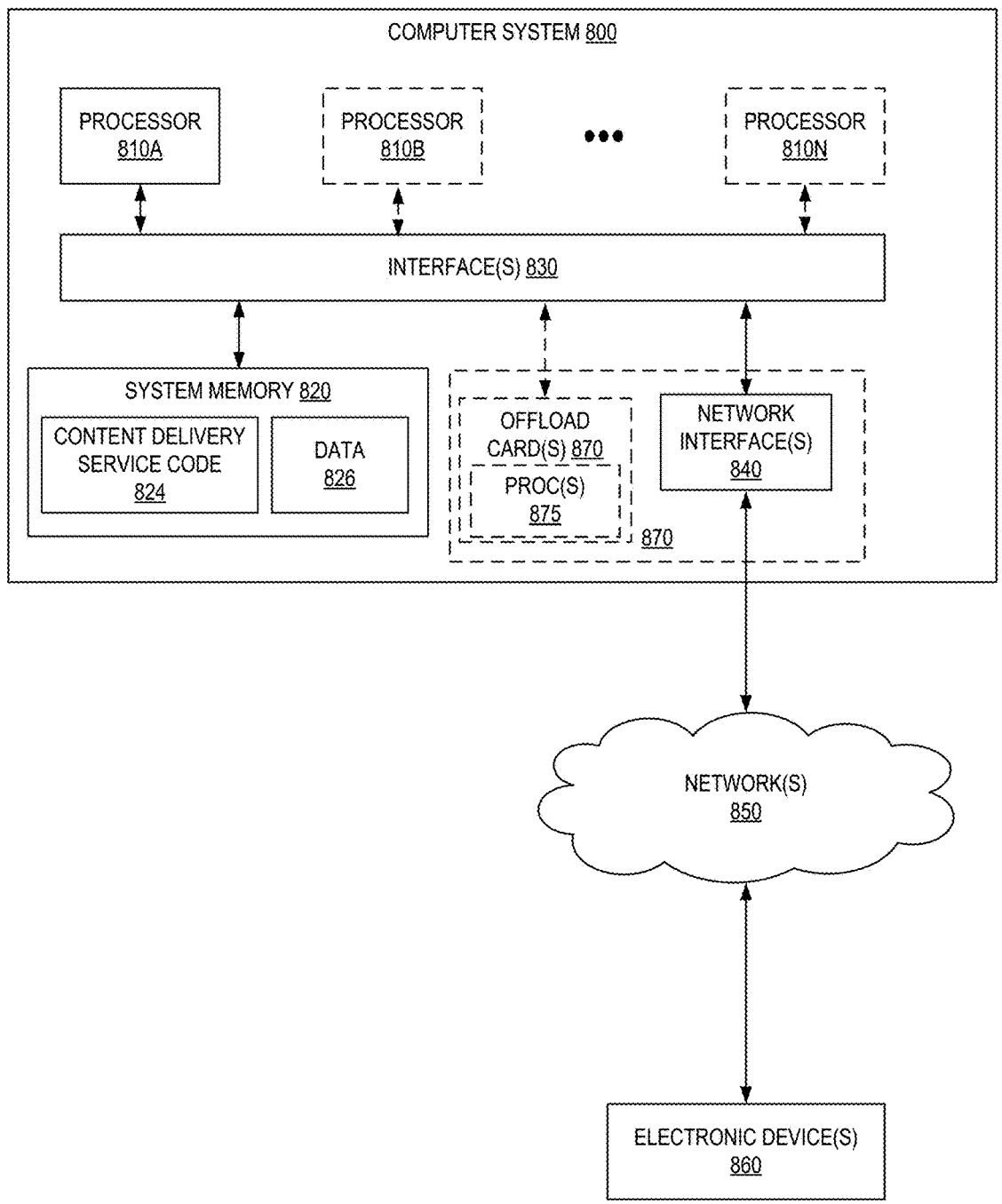
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as content delivery service code 824 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
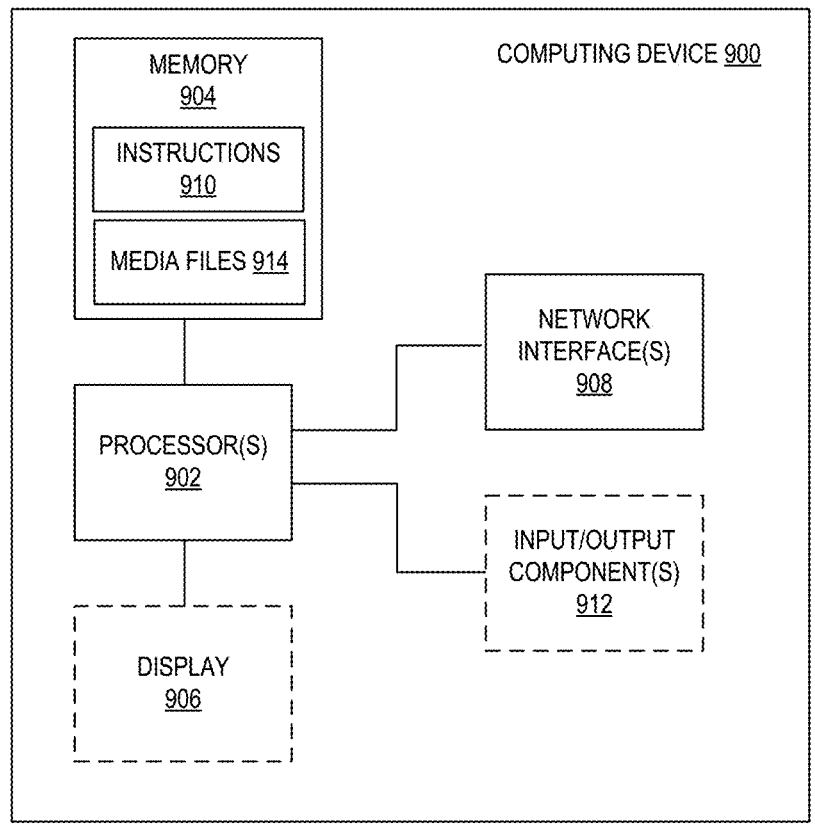
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement an anomaly detector as disclosed herein) and/or media files 914 (e.g., generated by content delivery service 106 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 126 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
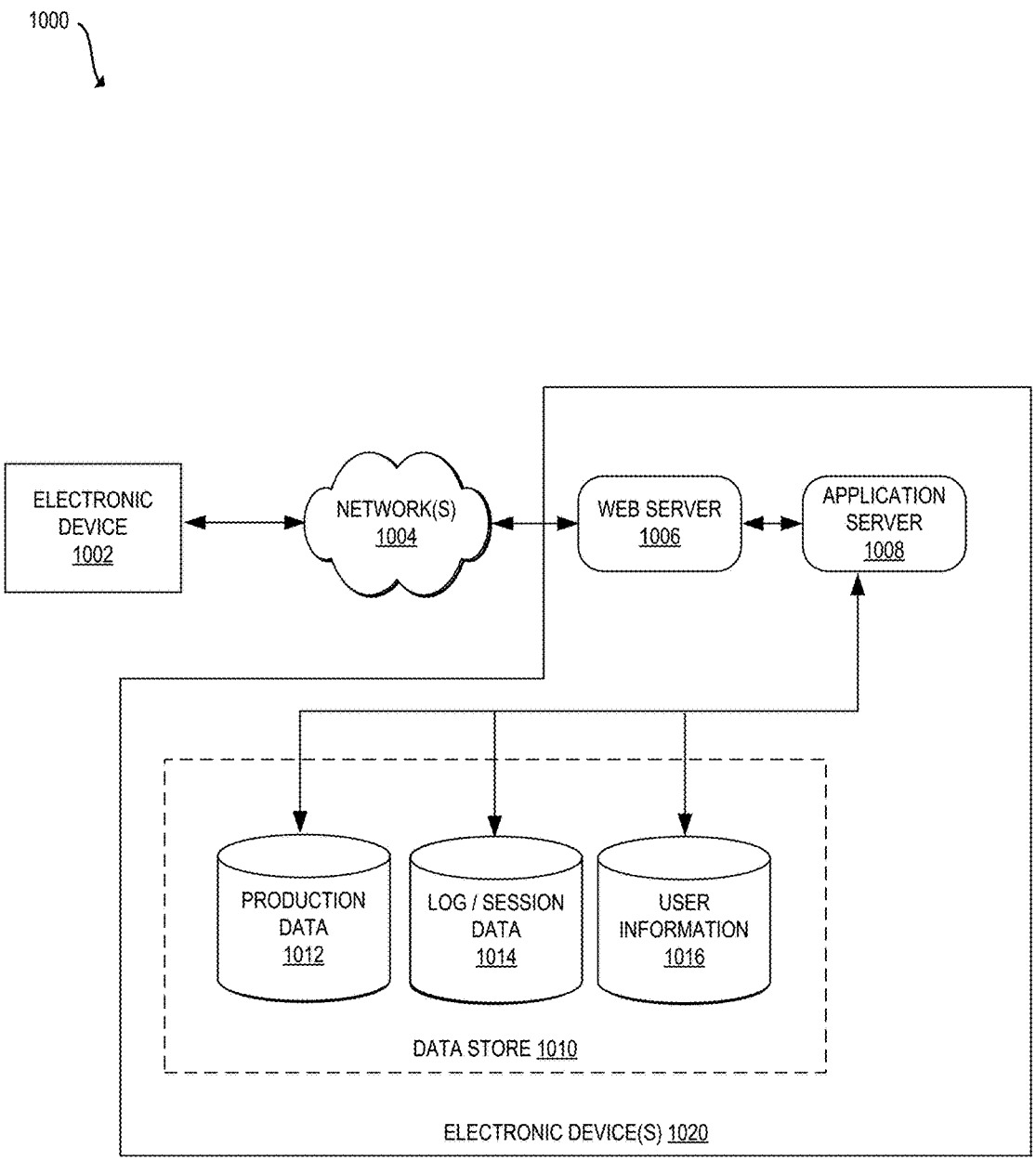
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages, or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed, or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a first real-time encoded live video, that is in a coded order that is different than a display order, at a content delivery service from a contribution encoder at a different location than the content delivery service;
performing, in the coded order, a real-time decode of the first real-time encoded live video by a distribution decoder of the content delivery service to generate a decoded video in the coded order;
performing, in the coded order, a real-time encode of the decoded video by a distribution encoder of the content delivery service to generate a second real-time encoded video in the coded order without waiting on a reordering of the decoded video into the display order in response to a maximum number of bidirectional predicted picture frames used in the distribution encoder not being greater than a maximum number of bidirectional predicted picture frames used in the contribution encoder; and
transmitting the second real-time encoded video in the coded order to a client device.

2. The computer-implemented method of claim 1, wherein the display order includes an intra-coded picture frame followed by a bidirectional predicted picture frame which is followed by a unidirectional predicted picture frame, and the coded order is the intra-coded picture frame followed by the unidirectional predicted picture frame which is followed by the bidirectional predicted picture frame.

3. The computer-implemented method of claim 1, wherein a chroma sampling of the first real-time encoded video is different than a chroma sampling of the second real-time encoded video.

4. A computer-implemented method comprising:
receiving a first encoded video, that is in a coded order that is different than a display order, at a content delivery service from a contribution encoder;
performing, in the coded order, a decode of the first encoded video by the content delivery service to generate a decoded video in the coded order;
performing, in the coded order, an encode of the decoded video by an encoder of the content delivery service to generate a second encoded video in the coded order without waiting on a reordering of the decoded video into the display order in response to a maximum number of bidirectional predicted picture frames used in the encoder of the content delivery service not being greater than a maximum number of bidirectional predicted picture frames used in the contribution encoder; and
transmitting the second encoded video to a client device.

5. The computer-implemented method of claim 4, wherein the display order includes an intra-coded picture frame followed by a bidirectional predicted picture frame which is followed by a unidirectional predicted picture frame, and the coded order is the intra-coded picture frame followed by the unidirectional predicted picture frame which is followed by the bidirectional predicted picture frame.

6. The computer-implemented method of claim 4, wherein the display order includes an intra-coded picture frame followed by a first bidirectional predicted picture frame, which is followed by a second bidirectional predicted picture frame that is used as a reference by the first bidirectional predicted picture frame, which is followed by a unidirectional predicted picture frame, and the coded order is the intra-coded picture frame followed by the unidirectional predicted picture frame which is followed by the second bidirectional predicted picture frame, which is followed by the first bidirectional predicted picture frame.

7. The computer-implemented method of claim 4, wherein a chroma sampling of the first encoded video is different than a chroma sampling of the second encoded video.

8. The computer-implemented method of claim 4, wherein the decode of the first encoded video does not reorder the decoded video into the display order.

9. The computer-implemented method of claim 8, wherein the encode of the decoded video does not reorder the second encoded video into the display order.

10. The computer-implemented method of claim 4, further comprising performing a real-time encode of a live video on premises with a camera capturing the live video to generate the first encoded video.

11. The computer-implemented method of claim 4, wherein the first encoded video is a stream.

12. The computer-implemented method of claim 4, wherein the performing the encode of a group of pictures comprising a plurality of frames of the decoded video begins before all of the plurality of frames of the group of pictures are sent to the content delivery service from the contribution encoder.

13. The computer-implemented method of claim 4, wherein the performing the encode of each decoded frame of the decoded video begins on receipt of that decoded frame.

14. The computer-implemented method of claim 4, wherein the performing the encode of each decoded frame of the decoded video begins on receipt of that decoded frame from a distribution decoder of the content delivery service by a distribution encoder of the content delivery service.

15. A system comprising:
a content delivery service implemented by a first one or more electronic devices, the content delivery service including instructions that upon execution cause the first one or more electronic devices to perform operations comprising:
receiving a first encoded video, that is in a coded order that is different than a display order, from a contribution encoder,
performing, in the coded order, a decode of the first encoded video to generate a decoded video in the coded order, and
performing, in the coded order, an encode of the decoded video by an encoder of the content delivery service to generate a second encoded video in the coded order without waiting on a reordering of the decoded video into the display order in response to a maximum number of bidirectional predicted picture frames used in the encoder of the content delivery service not being greater than a maximum number of bidirectional predicted picture frames used in the contribution encoder; and
a packaging service implemented by a second one or more electronic devices, the packaging service including instructions that upon execution cause the second one or more electronic devices to perform operations comprising transmitting the second encoded video to a client device.

16. The system of claim 15, wherein the display order includes an intra-coded picture frame followed by a bidirectional predicted picture frame which is followed by a unidirectional predicted picture frame, and the coded order is the intra-coded picture frame followed by the unidirectional predicted picture frame which is followed by the bidirectional predicted picture frame.

17. The system of claim 15, wherein the display order includes an intra-coded picture frame followed by a first bidirectional predicted picture frame, which is followed by a second bidirectional predicted picture frame that is used as a reference by the first bidirectional predicted picture frame, which is followed by a unidirectional predicted picture frame, and the coded order is the intra-coded picture frame followed by the unidirectional predicted picture frame which is followed by the second bidirectional predicted picture frame, which is followed by the first bidirectional predicted picture frame.

18. The system of claim 15, wherein a chroma sampling of the first encoded video is different than a chroma sampling of the second encoded video.

19. The system of claim 15, wherein the decode of the first encoded video does not reorder the decoded video into the display order.

20. The system of claim 15, wherein the performing the encode of each decoded frame of the decoded video begins on receipt of that decoded frame from a distribution decoder of the content delivery service by a distribution encoder of the content delivery service.

* * * * *